:# 2,766,032

IMPREGNATED CRUCIBLE

George Meister, Newark, N. J., assignor to the United States of America as represented by the United States Atomic Energy Commission No Drawing. Application November 16, 1943,
Serial No. 510,559

5 Claims. (Cl. 263—48)

This invention relates to crucibles and other refractory articles and to a method of making such articles.

In heat treating certain material, it is desirable to prevent contamination of the material being treated. This is especially true in the case of uranium and other metals that are highly reactive. Since the melting point of pure uranium is believed to be about 1129° C. and uranium containing impurities may have a melting point above 1800° C., it is necessary that crucibles be used that will withstand these high temperatures and yet remain chemically inert with respect to the melted uranium. Crucibles made of beryllia, thoria and zirconia have the above-mentioned requirements, but these materials are expensive and difficult to work. For this reason crucibles of reactive material have been lined with thoria, beryllia or zirconia. However, the lined crucible is also difficult to make and has a further disadvantage in that any crack or break that might develop in the lining would allow the melt to contact the reactive body of the crucible and thus contaminate the melt.

It is an object of the present invention to provide a relatively inexpensive refractory article that has high chemical resistivity and will withstand high temperatures.

Another object is to provide a crucible or other refractory article impregnated with a material of high chemical resistivity.

A further object is to provide a convenient method of impregnating a crucible of porous material with an inert, refractory material.

In accordance with this invention a crucible made of a highly refractory material such as alundum is impregnated with thoria, beryllia or zirconia, all of which are inert oxides. Alundum has been chosen to illustrate the invention because crucibles made from it have considerable mechanical strength, are commercially available, relatively cheap, and withstand high temperatures. However, uranium melted in commercial alundum crucibles is contaminated by reaction with the crucible. This reaction may be with impurities in the alundum itself or with the binder which is used in holding the powdered alundum together to form the crucible. When an alundum crucible or other article is impregnated with one of the inert oxides mentioned above, it will be covered with a film of material having high chemical resistivity, and yet its refractory qualities are not impaired.

The preferred method of accomplishing the impregnation comprises dipping an alundum crucible in a saturated solution of thorium nitrate. The dipped crucible is then dried first in air and then in a furnace at about 100° C. Following this the crucible is fired by slowly raising the temperature to about 1000° C. and holding it at this temperature until all the nitrate has decomposed to thoria, nitrogen oxides and oxygen. The nitrogen oxides and the oxygen leave the crucible as gases while the thoria remains in the interstices of said crucible. The dipping, drying and firing are preferably repeated a number of times, depending on the thickness of the crucible and the desired depth of impregnation. Usually from three to five repetitions of the process are sufficient for thorough impregnation.

When the above method is followed, the completed crucible is entirely coated by a layer of thoria. Furthermore, to the depth of impregnation, the pores of the material are filled with thoria and the particles of alundum and binder are coated by thoria. If a small break should occur in the coating the usefulness of the crucible would not be seriously impaired since the metal entering the break would still contact an impregnated portion and not the pure alundum.

Satisfactory crucibles for heating uranium may be prepared by following the above-described method for impregnating with beryllia or zirconia, if beryllium nitrate or zirconium nitrate is used instead of thorium nitrate. Furthermore, the method of this invention may be used in impregnating materials other than alundum, such, for example, as refractory clays, silicon carbide and others of a similar nature. For heat treating materials other than uranium other metal nitrates than those mentioned will also be found satisfactory for use in following the method of this invention.

The above-description is intended to be merely illustrative, and the scope of the invention is to be limited only by the appended claims.

I claim:

1. A method of making a porous refractory crucible chemically inert to uranium comprising, impregnating the crucible by dipping the same in a solution of a nitrate of a metal selected from the group consisting of thorium, beryllium and zirconium; drying the impregnated crucible; thereafter decomposing the metal nitrate to the corresponding oxide by firing the crucible; and repeating said impregnating, drying and firing until the pores of the crucible are impregnated to a predetermined depth with said oxide and the particles of the crucible are coated therewith.

2. A method of making an alundum crucible chemically inert to uranium comprising, impregnating the crucible by dipping the same in a saturated solution of thorium nitrate, drying the impregnated crucible, thereafter decomposing the thorium nitrate to thorium oxide by firing the crucible, and repeating said impregnating, drying and firing until the pores of the crucible are impregnated to a predetermined depth with said oxide and the particles of the crucible are coated therewith.

3. A method of making a porous refractory crucible chemically inert to uranium comprising, impregnating the crucible by dipping the same in a solution of a nitrate of a metal selected from a group consisting of thorium, beryllium and zirconium; drying the impregnated crucible at a temperature of about 100° C.; slowly raising the temperature thereof to about 1000° C.; maintaining said temperature until the crucible is fired and the metal nitrate is decomposed to the corresponding oxide; and repeating said impregnating, drying and firing until the pores of the crucible are impregnated to a predetermined depth with said oxide and the particles of the crucible are coated therewith.

4. A porous refractory crucible having a surface coated with a material of the class consisting of thoria, beryllia and zirconia and having a contiguous region below the coating wherein the pores of the crucible are filled with said material and the particles of refractory material comprising said crucible are coated therewith.

5. A porous alundum crucible that is coated with a material of the class consisting of thoria, beryllia and zirconia and having a contiguous region below the coating wherein the pores of the crucible are filled with said material and the particles of alundum comprising said crucible are coated therewith.

References Cited in the file of this patent

UNITED STATES PATENTS

| | | |
|---|---|---|
| 284,287 | Egleston | Sept. 4, 1883 |
| 369,091 | Bernstein | Aug. 30, 1887 |
| 1,296,188 | Huth | Mar. 4, 1919 |
| 1,518,818 | Rietz | Dec. 9, 1924 |
| 1,717,483 | White | June 18, 1929 |